United States Patent [19]

Donovan et al.

[11] Patent Number: 4,874,673

[45] Date of Patent: Oct. 17, 1989

[54] USE OF FUGITIVE PLASTICIZER IN AUTODEPOSITING COMPOSITION

[75] Inventors: Joseph C. Donovan, Drexel Hill; Bashir M. Ahmed, Ambler, both of Pa.

[73] Assignee: Henkel Corporation, Ambler, Pa.

[21] Appl. No.: 122,617

[22] Filed: Nov. 19, 1987

Related U.S. Application Data

[63] Continuation of Ser. No. 22,555, Mar. 5, 1987, abandoned, which is a continuation of Ser. No. 684,662, Dec. 20, 1984, abandoned.

[51] Int. Cl.$^4$ .............................................. B32B 15/08
[52] U.S. Cl. ................................ 428/463; 427/388.4; 427/437; 427/443.1
[58] Field of Search .................. 427/437, 388.4, 443.1; 428/463

[56] References Cited

U.S. PATENT DOCUMENTS

| | | | |
|---|---|---|---|
| 3,585,084 | 6/1971 | Steinbrecher et al. | 427/309 |
| 3,592,699 | 7/1971 | Steinbrecher et al. | 524/407 |
| 4,103,049 | 7/1978 | Nishida et al. | 524/407 |
| 4,277,385 | 7/1981 | Carroll et al. | 523/221 |
| 4,313,861 | 2/1982 | Bassett et al. | 524/561 |
| 4,347,172 | 8/1982 | Nishida et al. | 524/417 |
| 4,373,050 | 2/1983 | Steinbrecher et al. | 524/407 |
| 4,444,939 | 4/1984 | Postle et al. | 524/492 |
| 4,455,402 | 6/1984 | Amick et al. | 524/315 |

FOREIGN PATENT DOCUMENTS

| | | | |
|---|---|---|---|
| 0069839 | 1/1983 | European Pat. Off. | 524/317 |
| 0100130 | 8/1975 | Japan | 524/317 |

*Primary Examiner*—Joseph L. Schofer
*Assistant Examiner*—J. M. Reddick
*Attorney, Agent, or Firm*—Ernie G. Szoke; Wayne C. Jaeschke; Norvell E. Wisdom, Jr.

[57] ABSTRACT

Autodepositing compositions of the type that form coatings which tend to crack in the wet stage are modified by including in the composition a fugitive plasticizer, such as 2,2,4-trimethylpentanediol-1,3 monoisobutyrate, tributoxyethyl phosphate, ethylene glycol monohexyl ether, diethylene glycol monohexyl ether, or a mixture of phenyl glycol ethers.

5 Claims, No Drawings

USE OF FUGITIVE PLASTICIZER IN AUTODEPOSITING COMPOSITION

This application is a continuation of application Ser. No.022,555 filed 3, 5, 87 now abandoned which is a continuation of Ser. No. 684,662 filed 12, 20, 84 now abandoned.

FIELD OF THE INVENTION

This invention relates to the formation of resinous coatings on metallic surfaces. More specifically, this invention relates to the formation on metallic surfaces of resinous coatings by contacting the metallic surfaces with an autodepositing composition.

Autodepositing compositions, which are particularly suited to the coating of metallic surfaces, generally comprise aqueous acidic solutions of an oxidizing agent and dispersed resin solids, and usually dispersed pigment particles. An autodepositing composition is characterized by its ability to form on a metallic surface immersed therein a resinous coating which increases in thickness or weight the longer the time the metallic surface is immersed in the composition. This type of coating process, often referred to as "autodeposition", is similar to electrodeposition, but does not require the use of an external electrical current for operability, as is required in electrodeposition. Like a coating formed from electrodeposition, an autodeposited coating has a solids concentration (usually 20% or more) and many times greater than that (usually less than about 10%) of the composition from which it is formed.

A few examples of use applications for autodepositing compositions include the coating of metallic automotive parts and metallic components of home appliances to form thereon coatings which protect the underlying surface from corrosive elements. Presently, autodepositing compositions are used most widely in forming corrosion-resistant coatings on steel components used in the automotive industry, but they have wider applicability, as is reported in the literature.

It is known that the properties of autodeposited coatings are influenced by the type of constituents comprising the autodepositing compositions, including particularly the resin constituent of the composition. The source of this constituent is generally a latex, that is, an aqueous composition having dispersed therein a relatively high concentration (for example, 40–50 wt. % or more) of solid resin particles. Typically, the autodepositing composition is made by admixing a latex with the other ingredients comprising the composition, namely, acid, oxidizing agent and additional water, as well as optional ingredients, for example, pigment particles, and other ingredients as discussed hereinafter.

For many applications, it is mandatory that the autodeposited coating protect the underlying metallic surface from corrosive elements, for example, in the case of steel surfaces, moisture and salt. It is known that autodeposited coatings formed from certain types of resins have much better corrosion-resistant properties than coatings formed from other types of resins. In general, the corrosion-resistant properties of autodeposited coatings are improved significantly by treating the freshly formed, wet, uncured coating with an acidic aqueous solution of chromium.

For effective use in some applications, it is essential that the autodeposited coating have not only excellent corrosion-resistant properties, but also other properties, including, for example, good physical and aesthetic properties.

For certain applications, it is required that the autodeposited coating have the ability to resist being degraded by organic materials, for example: motor oil, gasoline, gasohol, diesel fuel, glycol type anti-freeze materials, methyl ethyl ketone, naptha and alcohols such a for example, isopropanol. It has been observed that autodeposited coatings formed from various types of resins have excellent corrosion resistant properties and other satisfactory properties, but they tend to be degraded upon being contacted at room and/or elevated temperature with one or more organic materials such as mentioned above. The degradation can take the form of a loss or softening of the coating, decrease in corrosion resistance, blistering and decrease in physical properties. Such degradation renders the coating unsatisfactory for use in applications in which the coated metal part comes into contact with such organic materials, for example, under the hood parts such as brake booster housings steering components, etc.

The present invention relates to means for forming autodeposited coatings which possess not only the ability to protect the underlying metallic substrate from the corrosive effects of inorganic materials such as water and salt, but which resist being degraded by organic fluids, such resistance being herein referred to as "solvent resistance".

Reported Developments

Numerous types of resins have been disclosed for use in autodepositing compositions in the following patents: British Patent No. 1,241,991; and U.S. Patent Nos. 3,585,084; 3,709,743; 4,191,676; 4,313,861; and 4,347,172. Examples of classes of resins disclosed for use in autodepositing compositions in the aforementioned patents include styrene-butadiene resins, acrylic polymer and copolymer resins, poly(vinyl chloride) resins, polyethylene resins, polytetrafluoroethylene resins, vinylidene chloride resins, acrylonitrile-butadiene resins, and urethane resins.

Within the aforementioned group of patents, U.S. Patent Nos. 3,709,743 and 4,313,861 refer specifically to the use of particular-type resins to form autodeposited coatings which have improved solvent resistance.

The aforementioned '743 patent discloses generally the use of resins prepared from vinyl and/or ethylenically unsaturated monomers and that increased solvent resistant properties can be achieved by including in the resin 0.25-10 wt. % of a cross-linking monomer,including those containing epoxide functional groups, for example, glycidyl methacrylates and acrylates, and methylol functional monomers, for example, methylol acrylamide or methacrylamide and alkylated methylol monomers, for example, methylated, ethylated or butylated methylol acrylamide or methacrylamide. Among the broad classes of resins disclosed in the '743 patent are those prepared from copolymers of: (A) polymerizable acids containing three to four carbon atoms; (B) one to eight carbon alcohol esters of polymerizable acids containing three to four carbon atoms; (C) acrylonitrile or methacrylonitrile; and (D) a vinyl aromatic monomer, such as styrene or vinyl toluene. Example 9 of this patent discloses in a general fashion that a coating formed from a composition including a resin containing polymerized N-methylol acrylamide, itaconic acid, ethyl acrylate and methyl methacrylate exhibited good acetone resistance.

The aforementioned '861 patent discloses the use in autodepositing compositions of resins prepared from: (a) methacrylic acid or acrylic acid; (b) at least one other polymerizable ethylenically monounsaturated monomer; and optionally (c) a hydroxy group-containing polymerizable vinylenically monounsaturated monomer that is different from any hydroxy group-containing monomer of (b) above; and optionally (d) a polymerizable vinylenically polyunsaturated monomer. The patent discloses that, in order to obtain a coating having a high degree of corrosion resistance, the resin should have a glass transition temperature (Tg) within the range of 2° C. to 50° C. The patent discloses further that improved gasoline resistance is best exhibited in coatings which are formed from a resin made from a monomeric mixture which includes acrylonitrile in an amount of about 10 to about 50 wt. % based on the total of the monomeric mixture. ASTM test information concerning the gasoline resistance of an autodeposited coating formed from a resin comprising in excess of 50 wt. % polymerized butyl acrylate and also polymerized acrylonitrile and methacrylic acid is set forth in Example 11 of this patent. Examples of the patent include also ASTM salt spray test results for chromium-treated coatings formed from various resins, including a resin comprising in excess of 50 wt. % polymerized butyl acrylate and also acrylonitrile, methacrylic acid, and styrene.

Although autodeposited coatings formed from resins described in the aforementioned '861 patent exhibit good corrosion resistant and solvent resistant properties, test work has shown that, for certain demanding applications, the solvent resistant properties of such coatings are not sufficient to meet test standards. An example of such a demanding application is under the hood parts requiring resistance to brake fluid and/or hot anti-freeze.

A survey of the extensive latex literature shows that there are numerous specific latexes which are promoted for use in particular applications because films or coatings formed therefrom possess unusually good properties which make them suitable for such use. One such latex is Rhoplex WL-91, an aqueous thermoplastic acrylic resin dispersion sold by Rohm & Haas Company. Coatings formed from this latex, the resin solids of which comprise polymerized acrylonitrile, are described as exhibiting substantially better solvent resistance, including resistance to hot ethylene glycol (anti-freeze), brake fluid, and gasoline, than coatings formed from other acrylic resin-based latexes. Accordingly, Rhoplex WL-91 has been proposed for use in forming coatings on various types of articles which come into contact with organic liquids, examples of such articles being oil cans, tractor hoods and mower housings. However, it has been found that coatings formed from autodepositing compositions which include Rhoplex WL-91 latex tend to crack in the wet stage, that is, between the time when the wet-coated part has been withdrawn from the autodepositing composition and prior to drying and complete coalescence of the coating such as is achieved by fusing or curing the coating at elevated temperature. Developmental work has shown also that the cracks remain in the coating even after cure or fusion at elevated temperature. Such cracks literally destroy the corrosion resistant properties of the coating.

Both the art relating to the formation of conventional coatings from latexes and to the formation of autodeposited coatings from autodepositing compositions suggest means for improving the qualities of coatings formed from such compositions. Thus, the latex art discloses that film or coating qualities, including maximum gloss, metal protection, and stain and solvent resistance can be improved by use in the latex of a coalescent, including, for example, the use of a mixture of butoxy ethanol, 2,2,4-trimethylpentanediol-1,3-monoisobutyrate (Texanol), and dibutylphthalate, such mixture being said to be suitable for use in latexes which include resins which form relatively hard coatings. The autodepositing art discloses the use of coalescing agents in autodepositing compositions to improve the qualities of autodeposited coatings, including,for example, corrosion resistance and appearance (for example, see U.S. Patent Nos.: 3,585,084; 4,313,861; and 4,347,172). In addition, Japanese Patent No. 7630245 discloses the treatment of an uncured autodeposited coating with an aqueous composition containing a water miscible coalescing agent comprising a compound having two or more oxygen-containing functional groups such as ester groups, hydroxy groups, carbonyl groups and ether linkages. Examples of such classes of compounds include alcohols, ketones, alcohol esters, ketone esters, ketone ethers and ester ethers. This. Japanese patent discloses that the treatment of uncured autodeposited coatings with such coalescing agents inhibits or deters the tendency of the cured form of the coating to blister, crack, and/or bridge. Developmental work gas shown, however, that use of water miscible coalescing agents of the type referred to in the aforementioned prior art relating to autodeposition is beset with problems.

U.S. Pat. No. 4,318,944 discloses that the tendency of autodeposited coatings to crack can be deterred or inhibited by maintaining the freshly formed autodeposited coatings in an environment substantially free of oxygen, including, for example, maintaining such coating in an environment comprising air having a relative humidity of above about 65%, preferably above about 80%. Although there are advantages that flow from the use of this development, there are also disadvantages associated with its use, including, for example, the need to provide in the coating line additional equipment for maintaining the aforementioned type of environment.

Accordingly, it is an object of the present invention to provide improved means for reducing or inhibiting the cracking 30. tendencies of autodeposited coatings comprising a particular class of resins.

Summary of the Invention

In accordance with this invention, autodepositing compositions of the type that form coatings which tend to crack in the wet stage are modified by including therein a material which deters or prevents said cracking as described below. It is believed that the present invention will be used most widely to deter or prevent the cracking of autodeposited coatings formed from an autodepositing composition which includes resin solids having a relatively high glass transition temperature (Tg), that is, at least about 55° C., said means comprising, including in the autodepositing composition in suitable form, a liquid material characterized by: (A) its being stable and immiscible (insoluble) in the acidic aqueous phase of the composition; (B) its being capable of being absorbed by the resin solids and plasticizing (softening) said solids without effecting an excessive swelling thereof; and (C) its being capable of vaporizing under the elevated temperature at which the coating is fused. For convenience, said liquid material is referred to herein as a "fugitive plasticizer".

The present invention also provides means for forming autodepositing compositions within the scope of the present invention and a process for forming crack-free autodeposited coatings.

In preferred form, the autodeposited coating has a high degree of solvent and corrosion resistance and is formed from an autodepositing composition which includes an acrylic-based, nitrile-containing resin having a glass transition temperature of at least about 58° C., and which is prepared from a soluble ferric iron-containing compound and hydrofluoric acid, and which includes also, in emulsified form, a fugitive plasticizer consisting essentially of 2,2,4-trimethylpentanediol-1,3-monoisobutyrate, the emulsifying agent associated with said plasticizer being an anionic emulsifying agent.

The present invention allows the coating applicator to form autodeposited coatings which are free of cracks from resins which tend to form cracked coatings, thereby enabling the applicator to make effective use of such resins, classes and species of which exhibit particularly good coating properties, such as, for example, corrosion resistance, solvent resistance and/or hardness. Other advantages that flow from the use of the present invention will be evident from the detailed discussion of the invention which follows.

Detailed Description of the Invention

Autodepositing compositions of the type to which this invention relates comprise, as essential constituents, resin solids dispersed in water and one or more soluble activating ingredients, namely, acid and oxidizing agent. It is believed that the activating ingredients, or "activator" as such ingredient(s) are often referred to, are effective in dissolving from the metallic surface being coated metal ions in an amount sufficient to directly or indirectly cause resin particles in the region of the metallic surface to deposit thereon in a continuous fashion, that is, in a manner such that there is a buildup in the amount of resin deposited on the surface the longer the time the surface is in contact with the composition. Such deposition of the resin on the metallic surface is achieved through the chemical action of the coating composition on the metallic surface and is attributed to the activating ingredients.

Examples of activators for converting aqueous dispersions of resin solids into autodepositing compositions are disclosed in U.S. Patent Nos: 3,592,699; 3,709,743; 4,103,049; 4,347,172; and 4,373,050, the disclosures of which are incorporated herein by reference. The activating system generally comprises an acid/oxidizing system, for example: hydrogen peroxide and HF; $HNO_3$; a ferric-containing compound and HF; and other soluble metal-containing compounds (for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 g/l) and an acid that can be used alone or in combination with hydrofluoric acid, and including, for example, sulfuric, hydrochloric, nitric, and phosphoric acid, and an organic acid, including, for example, acetic, chloracetic and trichloracetic.

The preferred activating system comprises a ferric-containing compound and hydrofluoric acid. Thus, a preferred autodepositing composition comprises a soluble ferric-containing compound in an amount equivalent to about 0.025 to about 3.5 g/l of ferric iron, most preferably about 0.3 to about 1.6 g/l of ferric iron, and hydrofluoric acid in an amount sufficient to impart to the composition a pH within the range of about 1.6 to about 5. Examples of the aforementioned ferric-containing compounds are ferric nitrate, ferric chloride, ferric phosphate, ferric oxide, and ferric fluoride, the last mentioned being preferred.

Although the present invention is suited in general to use in applications involving resins which form autodeposited coatings which tend to crack, it can be used to particularly good advantage in applications in which such resins possess also the ability to form autodeposited coatings having a high degree of solvent and corrosion resistance, and also hardness. Examples of such resins include those whose Tg is about 55° to 100° C. Preferably, resins whose Tg is about 58° to about 65° C. are used. Such resins, however, do not readily form continuous films. They exhibit a tendency to form coatings which crack during drying, particularly at low relative humidities. It is known to use coalescing agents to aid in the formation of continuous films comprising such hard resins. However, when common coalescing agents were evaluated for use in autodepositing compositions, it was found that problems were encountered. For example, it was found that a coalescing agent, such as ethylene glycol monobutyl ether acetate, has a strong tendency to hydrolyze in the acidic autodepositing composition. This results in problems such as instability of the autodepositing bath. Such problems do not necessarily occur immediately, but only after several weeks or months, whereas autodepositing baths are expected to be stable for such long periods of time, and even longer time periods. Another problem that can be encountered when using some common coalescing agents is that a satisfactory bath of autodepositing composition cannot be prepared readily. For example, this can occur as a result of the coalescing agent's being imbibed by the latex resin particles to an extent such that the particles swell excessively. This causes the latex to rapidly increase in viscosity to a degree such that it cannot be used satisfactorily for preparation of the autodepositing composition. As discussed below, the use of the present invention avoids the aforementioned problems.

With respect to a class of particular resins which can be used to form autodeposited coatings having particularly good wet film strength and high corrosion and solvent resistance, and rapid coating and curing properties, the following is recommended: a resin copolymer prepared by copolymerizig the following monomers:

(A) acrylic acid or an alkyl-substituted acrylic acid, preferably a substituted lower alkyl (up to 6 carbon atoms), most preferably methacrylic acid;

(B) an acrylic ester, such as, for example, ethyl acrylate, butyl acrylate, and ethyl hexyl acrylate, or an alkyl-substituted acrylic ester, preferably a substituted lower alkyl (up to 6 carbon atoms), most preferably a methacrylic ester, for example, methyl methacrylate, and such esters having preferably alkyl groups of up to about 10 carbon atoms;

(C) a nitrilo monomer, such as, for example, acrylonitrile and methacrylonitrile; and (D) an addition polymerizable aryl compound, such as, for example, styrene, methyl styrene, and vinyl toluene. Although the constituents comprising the above-described resin can vary over a relatively wide range, in general, the resin will comprise the polymerized constituents in the following amounts:

(1) about 1 to about 0 wt. %, preferably about 3 to about 7 wt. % of monomer (A) above;
(2) about 25 to about 50 wt. %, preferably about 30 to about 40 wt. % of monomer (B) above;
(3) about 15 to about 40 wt. %, preferably about 20 z0 to about 30 wt. % of monomer (C) above; and
(4) about 10 to about 50 wt. %, preferably about 20 to about 45 wt. % of monomer (D) above.

A preferred resin is prepared by polymerizing methacrylic acid, ethyl hexyl acrylate, acrylonitrile, and styrene.

The source of the resin is most conveniently a latex, that is, an aqueous dispersion of solid particles of the resin. The resin can be prepared according to available techniques, for example, by emulsion polymerization processes, particularly seed polymerization or semicontinuous emulsion polymerization processes, the latter two being preferred. Some examples of emulsifiers that can be used in the polymerization process for preparing the resin are sulfates, sulfonates, and sulfosuccinates. Peroxides, hydroperoxides, and persulfates, for example, potassium persulfate, are examples of initiators that can be used in the polymerization process. Buffers such as phosphates, citrates, acetates and other weak acid salts can be used. Mercaptans, such as dodecyl mercaptan, are examples of chain transfer agents that can be used in the polymerization process.

Exemplary properties of a latex comprising a resin of the aforementioned type are as follows: solids content within the range of about 35 to about 55 wt. %; pH in the range of about 2 to about 10; minimum film-forming temperature of about 52° C. to about 70° C.; Brookfield Viscosity (#3 spindle, 60 rpm) of about 100 to about 2500 cps; and Tg at onset being a minimum of 55° C.

Latexes containing resin of the aforementioned type are known and are commercially available. A particularly preferred latex for use in the practice of the present invention is Rhoplex WL-91 latex manufactured by Rohm and Haas.

If desired, the autodepositing composition can be prepared from two or more latexes containing different resins. Preferably, such a composition will comprise a blend of the acrylic-based, nitrile-containing polymers described above, typically in an amount of about 50 to about 95% of the total resin solids, and one or more other latexes including, for example, styrene-butadiene resins, poly(vinyl chlorides), acrylic resins and the like.

The amount of resin comprising the coating composition of the present invention can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher amount of resin particles in the composition, the heavier the coating formed, other factors being the same. Although coating compositions can be formulated to include about 5 to about 550 g/l of resin solids, the amount of the resin solids will tend to vary depending on the other ingredients comprising the composition and also on the specific latex or resin used. For many applications, good results can be achieved utilizing about 30 to about 150 g/l of resin solids in the composition.

.The liquid material, that is, the constituent termed herein the "fugitive plasticizer", which functions as an anticracking agent, is a material which is immiscible (insoluble) in water and also in the acidic aqueous phase comprising the autodepositing composition. Developmental work has shown that problems are encountered when using conventional water/acid soluble coalescing agents as substitutes for the fugitive plasticizer of the present invention, for example, problems of the type mentioned above Without wishing to be limited thereby, the following theory is proposed for the mechanisms involved in the use of the fugitive plasticizer described herein. It is believed that the fugitive plasticizer is present in the composition in the form of liquid droplets or particles dispersed in the aqueous phase of the composition. It is believed further that the liquid droplets of fugitive plasticizer saturate the aqueous phase surrounding each of the droplets and that the plasticizer diffuses into or is absorbed by the resin solids which are also dispersed in the aqueous phase of the composition. The presence of the fugitive plasticizer of the present invention in the composition does not effect a consequential increase in the viscosity thereof, as is experienced with materials which have an excessive solvating effect on the resin particles. It is believed also that the presence of the fugitive plasticizer in the particles results in a softening thereof, thereby facilitating formation of the resin particles as they form into a continual crack-free coating or film as water evaporates from the , coated surface. As the resin coating is fused by the heat thereof, the fugitive plasticizer is driven off. y, the hardness and strength properties of the coating are adversely affected, as they would tend to be if the remained in the coating. It is noted also that the the fugitive plasticizer in the autodepositing composition not affect adversely the coating characteristics of the compostion.

One or motive plasticizers can be included in the autodepositing com Examples of fugitive plasticizers which can be used in practice of the present invention include: 2,2,4-trimethylpentanediol-1,3-monoisbutyrate texanol, butoxyethylphosphate ethylene glycol monohexyl ether, diethylene glycol monohexyl ether; and phenylglycol ethers.

The presence plasticizer in the composition aids in deterring the of the coating. However, it is recommended that there used at least about 4 parts by weight of the fugitive per hundred parts by weight of resin (hereafter"PHR") although it should be understood that this recommend rective minimum amount may tend to vary depending on the part resin used and other parameters of the coating operation as, for example, the humidity conditions to which the freely formed coating is exposed. The maximum amount of fug ve plasticizer is dictated by various factors, including, example, amounts which tend to adversely affect the coating the coating itself and economic considerations. For applications, it is believed that a suitable range will be about 8 to about 30 PHR of the plasticizer with a preferred amount range being about 10 to about 25 PHR of the plasticizer.

The fugitive plasticizer is preferably present in the composition in emulsified form. Any suitable emulsifying agent can be used to emulsify the liquid fugitive plasticizer. The emulsifying agent, a material which has surface active properties, should not affect adversely the autodepositing composition or the properties of coatings formed therefrom. For this purpose, the emulsifying agent should comprise a surface active material which is anionic or nonionic in character. Amphoteric surface active agents which in the acidic medium of the autodepositing composition display anionic characteristics can be used also.

Examples of emulsifying agents that can be used are the following liquid materials: disodium monooleamide polyethylene glycol 2-sulfosuccinate; sodium sulfosuccinate half ester; sodium mono-didodecyl disulfonate diphcnyl oxide; and alkylated diphenyl oxide disulfonate. Commercially available emulsifying agents include those sold under the following trademarks: Standapol SH 100; Avirol SS 5100; Disponil SUS 90; and Dowfax 2Al.

It is preferred to use an emulsifying agent which is anionic. Particularly good results have been achieved utilizing an alkylated diphenyl oxide disulfonate.

The emulsification of the organic liquid fugitive plasticizer can be effected according to conventional techniques. For example, an aqueous solution of the emulsifying agent can be added to the liquid fugitive plasticizer with vigorous stirring to produce liquid droplets or particles of the fugitive plasticizer having associated therewith the emulsifying agent uniformly dispersed in the aqueous continuous phase of the emulsified composition. Additional water can be added to the composition, as desired, during the agitation thereof. The amount of emulsifying agent used is that needed to effect thorough emulsification of the fugitive plasticizer and produce the uniform dispersion of the plasticizer droplets in the aqueous phase of the composition. For reasons expressed below, it is preferred to avoid the use of excess amounts of the emulsifying agent.

In accordance with the present invention, formulation of an autodepositing composition containing emulsified fugitive plasticizer is effected as follows. The aqueous composition of emulsified fugitive plasticizer is added to an aqueous dispersion of the resin solids, for example, a latex thereof which includes a resin solids concentration somewhat higher than that desired in the operating bath of the autodepositing composition. This addition is made slowly and with agitation of the aqueous dispersion of resin solids, such agitation being not so as to produce a strong vortex. After the addition of the emulsified fugitive plasticizer, it is absorbed by the resin solids. This can be accelerated by mildly agitating the composition over a several-hour period. Optional constituents, for example, pigment can be added to the resulting composition as desired.

An alternative method for preparing an aqueous composition comprising dispersed resin solids and emulsified fugitive plasticizer comprises emulsifying the fugitive plasticizer in an aqueous dispersion of the resin solids. For example, the emulsifying agent can be added to a latex and mixed therein. Thereafter, the fugitive plasticizer can be added to the composition with sufficient mixing to effect emulsification. Additional water can be added with stirring, as well as other solids such as pigment.

After preparation of the aqueous composition comprising the resin solids and emulsified fugitive plasticizer, the activating ingredients are added to form the autodepositing composition. If necessary, additional water can also be added as to provide a composition that has the resin solids content desired during the coating operation.

The present invention contemplates also an autodepositing composition which includes the fugitive plasticizer in a form other than an emulsified form, for example, in a form in which the fugitive plasticizer is not associated with an emulsifying agent. Alternatively, the fugitive plasticizer can be added directly to an aqueous dispersion of resin solids, for example, a latex, and mixed therewith, after which, the resulting mixture can be used in preparing the autodepositing composition.

Irrespective of the for in which the plasticizer is present in the composition or the particular method used to prepare the composition, prior to use thereof, the fugitive plasticizer and resin solids should be brought into contact for a time sufficient to allow the plasticizer to be absorbed by the resin solids. Although such contact time may vary from one application to the next, it is recommended that such contact time be at least about 1 hour.

As the bath of autodepositing compositions is used, the solids content thereof, including resin solids, and pigment if present, is decreased. Replenishment of the bath should be effected with a concentrated form of an aqueous dispersion of the resin solids and emulsified fugitive plasticizer, and pigment if present. Such replenishing compositions can be prepared in the manner described above it connection with the make-up of the bath.

Aforementioned U.S. Patent No. 4,191,676 discloses that the concentration of any surfactant present in the aqueous dispersion of resin solids should be relative ely low so that the aqueous phase of the autodepositing composition has a surfactant concentration below the critical micelle concentration and preferably below the surfactant concentration which corresponds to the inflection point on graph of surface tension versus the logarithm of surfactant concentration in the composition, as referred to in the aforementioned '676 patent. A surprising aspect of the present invention is that it has been observed that the presence of the emulsifying agent (a surface active material) can effect an increase in the wet adhesive strength and wet cohesive strength of the freshly formed autodeposited coating. Although the typical autodeposited coating is capable of withstanding a water rinse afrer it has been freshly formed and before it is cured, the adhesive and cohesive properties of such coatings are not usually high enough to withstand spray rinsing at relatively high pressures. In contrast, it is believed that the presence of the emulsifying agent in the uncured matrix of the freshly formed autodeposited coating tends to increase the adhesive and cohesive strength of the coating by reducing the amount of water that is normally present in the spaces between the latex polymer particles. This, together with the hydrophobic characteristics of the f give plasticizer are believed to cause repulsion of impinging spray water. Coatings containing such compounds can readily be seen to shed water very rapidly.

Optional ingredients can be added to the composition of the present invention as desired. For example, it is believed that the present invention will be used most widely in curing pigmented autodeposited coatings. For this purpose, suitable pigments can be included in the composition. Examples of pigments that can be used are carbon black, phthalocyanine blue, phthalocyanine green, quinacridone red, benzidene yellow and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using an aqueous dispersing in an amount such that the composition contains about 0.2 to about 5 g of furnace black/100 g of resin solids.

Many pigments are available in aqueous dispersions which may include surfactants or dispersing agents for maintaining the pigment particles in dispersed state. When utilizing such pigment dispersions in the composition of the present invention, they should be selected so that the surfactant concentration in the aqueous phase of the composition is below the CMC, preferably below the surfactant concentration which corresponds to the inflection point on a graph of surface tension versus the logarithm of surfactant concentration in the composition.

Colored coatings can also be cured in accordance with the present invention. They can be formed from compositions which include a dye, examples of which include rhodamine derived dyes, methyl violet, safranine, anthraquinone derived dyes, nigrosine, and alizarin cyanine green. These are but a few examples of dyes that can be used.

Examples of other additives that may be used in the autodepositing composition are those generally known to be used in formulating paint compositions, for example, UV stabilizers, viscosity modifiers, etc.

Various steps of the overall coating process can be like those of the prior art, except as noted below. For example, cleaning of the metallic surface prior to coating and any water rinse steps effected subsequently to the cleaning step can be in accordance with the teachings of aforementioned U.S. Pat. No. 4,191,676. With respect to contacting the metallic surface with the autodepositing composition, it is believed that, for most applications, desired coating thicknesses can be obtained by immersing the metallic surface in the composition for a period of time within the range of about 30 u seconds or even less to about 3 minutes. Good results have been achieved utilizing a time of immersion of about 60 seconds to about 180 seconds with compositions containing about 1 to about 10 wt. % of resin solids. However, it should be understood that longer or shorter periods of time can be used. Agitating the composition aids in maintaining it uniform and in improving the uniformity of the coatings formed. Other factors held constant, heating of the composition will result in heavier oatings. However, satisfactory results can be obtained by operating the coating process at ambient temperature.

Water washing the coated surface after it has been withdrawn from the composition, and before significant drying takes place, is effective in removing therefrom residuals such as acid and other ingredients of the composition that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing or spraying with tap or deionized water. Further, the residuals can be removed or rendered unreactive by treatment with an alkaline solution suitably a mild alkaline solution, for example, a solution of about 0.1 to about 2 g/l of caustic.

Prior to curing the autodeposited coating in accordance with the present invention, it can be subjected to a treatment which is designed to increase the corrosion resistance of the coating. Examples of such treatments include rinsing the freshly applied coating with aqueous solutions of chromium compounds or with aqueous solutions of phosphoric acid. For example, U.S. Pat. Nos. 3,795,546 and 4,030,945 disclose methods of treating freshly formed autodeposited coatings with aqueous rinse solutions containing hexavalent chromium or aqueous solutions containing mixtures of hexavalent chromium and formaldehyde-reduced forms of hexavalent chromium to improve the corrosion resistance of the autodeposited coatings. By way of example, such aqueous rinse composition can comprise a total chromium concentration within the range of about 3.0 g/l (expressed as $CrO_3$) to about 40 g/l wherein from about 40-95% of the chromium is in its hexavalent state and the remainder of the chromium is in its reduced state. U.S. Pat. No. 3,647,567 discloses the use of chromium-containing solutions and also the use of an aqueous solution of phosphoric acid.

The mere presence of hexavalent chromium in the treatment solution appears to improve the corrosion resistant properties of the coating, with increasing amounts giving increased improvements. Accordingly, the amount used will in general be governed by the corrosion resistant properties required for the specific application. It is recommended that at least about 0.01 g/l of hexavalent chromium be used and that the amount be adjusted upwardly as required, if necessary.

After chemical treatment of the freshly formed coating, the treated coating can, if desired, be subjected to a water wash.

Following final treatment of the wet coating, it should be cured. Fusion of the resinous coating renders it continuous, thereby improving its resistance to corrosion and its adherence to the underlying metallic surface' In general, heat will be required to fuse the coating. The fusion of the coating should be carried out under temperature and time conditions which do not adversely affect the desired properties of the coating. Exemplary conditions used in fusing coatings produced according to the present invention are temperatures of about 210° F. to about 485° F. for periods of time within the range of about 10 to about 50 minutes, depending on the mass of the coated part. Baking the coating for a period of time until the metallic surface has reached the temperature of the heated environment has been used effectively.

Preferred operating steps for forming resinous coatings on steel surfaces, for example, car frames made from hot rolled steel and brake booster housings, leaf springs, axels, radiators, etc. which coatings provide excellent solvent resistance and corrosion resistance after being subjected to salt spray (ASTM B117) for at least 504 hours include the following:

(A) cleaning the steel surface, preferably to the extent that a water break-free film can be formed on the surface;

(B) water rinsing the cleaned surface to remove therefrom residual cleaning agent;

(C) immersing the surface in the preferred pigmented coating composition, as described above, for a period of time of about 60 to about 180 seconds to form on he surface a coating having a thickness of about 0.6 to about 1.0 mil;

(D) withdrawing the coated surface from the composition, and either immediately or after a partial air dry of about 1 to about 180 seconds, water rinsing the coated surface to remove therefrom residual coating composition and superficial coating film;

(E) contacting the coated surface with an aqueous chromium rinse solution comprising about 0.5 to about 20 g/l of total chromium, with about 1.0 to about 15 g/l being hexavalent chromium and the remainder of the chromium being in the reduced state for about 10 to about 120 seconds; and (F) baking the coated surface at a temperature within the range of about 212° F. to about 480° F. for a period of time of from about 10 minutes to about several hours without adverse effect depending on the mass of the metal part to be coated.

EXAMPLES

The following examples are illustrative of the present invention. Comparative examples are also set forth also.

Example 1-C

In this comparative example, it is shown that the latex below, which is reported as having a glass transition temperature (Tg) of about 60° C., does not form continuous films can drying. The following autodepositing compositions is formulated.

| Ingredients | Amounts |
|---|---|
| Rhoplex WL-91 latex (41.5% solids) | 145 g/l |
| ferric fluoride | 3 g/l |
| hydrofluoric acid | 1.3 g/l |
| water | to make 1 liter |

The above composition is prepared by stirring the water into the latex to a volume of 950 ml. Fifty ml of a solution comprising 3 g of ferric fluoride and 1.3 g of hydrofluoric acid are then stirred into the composition.

Cold rolled, mild steel panels are then immersed in the composition for 75 seconds at room temperature. Upon removal the composition, the panels are exposed to air at 22° C and the 50% R.H. In less than 10 seconds, the wet coatings begin Cracks remain after fusing the coatings at 320° F. for Such cracked coatings are unsuitable for use in industry.

Example 1

This example is illustrative of a pigmented latex concentrate of the present invention and of the type that can be used to prepare or make up working baths, as well as to replenish them. It also illustrates a procedure for preparing the pigmented latex concentrate.

| Ingredients | Amounts |
|---|---|
| Texanol fugitive plasticizer | 65.93 g/l |
| Dowfax 2A1 (45%) emulsifying agent | 0.85 g/l |
| water (first portion) | 14.65 g/l |
| Rhoplex WL-91 latex (41.5% solids) | 882.68 g/l |
| water (second portion) | 40.17 g/l |
| Aquablak S pigment dispersion | 24.42 g/l |
| Total | 1028.70 g/l |

An emulsion is prepared by adding the Dowfax 2Al to the Texanol and while mixing vigorously, the first portion of water is added slowly. Mixing is continued for a time sufficient to form the emulsion. The emulsion is added slowly to a well agitated, but with a minimum vortex, mixture of Rhoplex WL-91 and the second portion of water. After addition is complete, the container holding the composition is covered to reduce evaporation losses. Agitation is continued at a slow rate for 3, hours. Agitation is terminated and the covered container is allowed to equilibrate at room temperature for about 1 hour. At the end of this period, the Aquablak S is added to the composition. This is effected with slow deliberate agitation to avoid foam generation. Agitation is continued for 2 hours until a homogeneous black mixture is achieved.

Example 2

This example illustrates the preparation of an autodepositing composition of this invention from the pigmented/latex concentrate of Example 1. A one-liter bath is prepared by transferring 165 ml of the pigmented/latex concentrate of Example 1 into a 1 liter plastic beaker. Water is stirred in to a volume of 950 ml. Finally, 50 ml of a solution containing 3 g of ferric fluoride and 1.3 g of hydrofluoric acid are stirred into the diluted pigmented latex to form the autodepositing composition.

A panel of cold rolled, mild steel is immersed in the autodepositing composition for 110 seconds. Upon withdrawal of the coated panel from the composition, it is rinsed with water and then baked 20 minutes at 320° F. The resulting coating is uniformly black and has a thickness of 0.75 mil. The freshly formed uncured coating and the cured coating are free of cracks.

Example 3

This example illustrates the emulsification of a fugitive plasticizer in a latex to form a composition which can be converted into an autodepositing composition upon the addition thereto of activating ingredients.

| Ingredients | Amounts |
|---|---|
| Rhoplex WL-91 latex (41.5% solids) | 882.68 g/l |
| Dowfax 2A1 (45%) emulsifying agent | 0.85 g/l |
| Texanol fugitive plasticizer | 65.93 g/l |
| water | 54.82 g/l |
| Aquablak S pigment dispersion | 24.42 g/l |
| Total | 1028.70 g/l |

The latex is agitated at a rate to promote efficient mixing but without generation of excessive foam. The Dowfax 2Al is added to the agitated latex, and the mixture is stirred thoroughly. The Texanol is then added and the rate of agitation is increased to the degree necessary to assure its rapid dispersion throughout the mixture. Mixing is continued for approximately 3 hours. The water is then added and agitation is reduced to avoid foam generation. Mixing is continued for 10 minutes and then the Aquablak-S is added with mixing until the color of the composition is uniform (approximately 1 hour).

Examples 4, 2-C & 3-C

This group of examples illustrates the improved solvent resistance of autodeposited coatings comprising a resin within the scope of the present invention relative to those formed from prior art compositions. The following autodepositing compositions were prepared.

| | Amounts, g/l | | |
|---|---|---|---|
| Ingredients | Example 4 | Example 2-C | Example 3-C |
| Rhoplex WL-91[1] latex (41.5% solids) | 144.6 | — | — |
| Darex 637[2] latex (54% solids) | — | 185 | — |
| Acrylic resin[3] latex (40.7% solids) | — | — | 246 |
| Texanol fugitive plasticizer | 10.8 | — | — |

The availability of fugitive plasticizers which vaporize from the resin coating at normally used curing conditions (for example, temperatures of about 210° F. to about 375° F. and curing times of about 15 to about 45 minutes at atmospheric pressure) are also an advantage of the present invention.

As seen from examples set forth above, coating compositions within the scope of the present invention can be used to form hard coatings which have a high degree of corrosion resistance and solvent resistance. Moreover the coatings formed from these compositions are tightly adherent to the metal surface, being able to withstand pressure rinsing immediately following removal from the coating bath. The ability of the coating composition to coat rapidly and withstand spray rinsing has the important advantage of allowing the user to accelerate production rates in that it is possible to produce coatings of desired thicknesses within relatively short periods of time and hard coatings which also have excellent corrosion resistant and solvent resistant properties. In addition, the present invention provides the coating applicator with the opportunity to use in an autodepositing process resins which have a relatively high Tg, and to thereby take advantage of their unique properties without encountering problems associated with the cracking of coatings formed from such resins.

We claim:

1. In a process for forming an autodeposition coating on a metallic substrate by immersing said substrate it a autodeposition composition comprising an aqueous latex dispersion, an acid, and an oxidizing agent, for a time effective to impart a coating of a desired thickness, and then heat-curing said coating, the improvement comprising:

(A) employing a latex composition whose resin solid monomers consist essentially of a mixture of
  (1) about 1–10 wt. % of acrylic acid or an alkyl substituted acrylic acid;
  (2) about 25–50 wt. % of an acrylic ester or an alkyl substituted acrylic ester;
  (3) about 15–40 wt. % of a nitrilomonomer; and
  (4) about 10–50 wt. % of an addition polymerizable aryl monomer, wherein the percentages are based on the weight of the resin solids; and
(B) adding to said autodeposition composition a plasticizer-effective and film cracking-preventative effective amount of a fugitive plasticizer which is substantially water insoluble and vaporizable at the fusion temperature of said latex composition and which is selected from the group consisting of 2,2,4-tri-methylpentanediol-1,3 monoisobutyrate, tributoxyethyl phosphate, ethylene glycol monchexyl ether, diethylene glycol monochexyl ether, and a mixture of phenyl glycol ethers.

2. The process of claim 1 wherein said plasticizer is 2,2,4 2-trimethylpentanediol? 1,3 monoisobutyrate.

3. The process of claim 1, wherein said plasticizer is 2,2,4-trimethylpentanediol-1,3 monoisobutyrate; said acrylic acid or substituted acrylic acid is unsubstituted acrylic acid; said acrylic ester is an ester of unsubstituted acrylic acid; said nitrilomonomer is acrylonitrile; and said addition polymerizable aryl monomer is styrene.

4. The process of claim 3, wherein said acrylic ester is ethyl hexyl acrylate.

5. An autodeposition coating for a metallic substrate formed by the process of claim 1.

* * * * *